March 6, 1934.  J. J. BOLAND  1,950,350
VIBRATION DAMPENER
Filed May 6, 1931　　2 Sheets-Sheet 1

INVENTOR.
JOSEPH J. BOLAND.
BY
ATTORNEY.

March 6, 1934.  J. J. BOLAND  1,950,350
VIBRATION DAMPENER
Filed May 6, 1931  2 Sheets-Sheet 2

INVENTOR.
JOSEPH J. BOLAND

Patented Mar. 6, 1934

1,950,350

UNITED STATES PATENT OFFICE 1,950,350

VIBRATION DAMPENER

Joseph J. Boland, Keyport, N. J., assignor to Aeromarine Plane & Motor Company Inc., a corporation of New York Application May 6, 1931, Serial No. 535,391

12 Claims. (Cl. 74—38)

This invention relates to vibration dampeners and more particularly to the type applicable to revolving members which are subjected to intermittent power impulses such, for instance, as the crank shaft of an internal combustion engine.

Vibrations in an engine may arise from two main sources: Either intermittent torque due to the turning effort of the crank against the frame of the engine or, unbalanced forces in the crank which cause it to seek its true center of rotation. Vibrations of the first class may arise from having too great an interval between the impulses and may be dampened out by introducing a friction clutch or resilient member somewhere in the propeller drive. This invention deals with vibrations of the second class or those due to unbalanced dynamic forces in the crank assembly.

With respect to the unbalanced forces present in the crank, it is well understood that, due to the angularity of the connecting rod, the reciprocating parts attached to the crank, travel at a velocity during one-half the revolution different from the velocity in the other half with consequent variation in acceleration.

Single cylinder engines are partially balanced by placing a counterweight opposite the crank pin on the shaft, thus balancing the rotating weight. The reciprocating weight, in the average single cylinder engine, would require one and one quarter times itself at top center, zero at a point before midstroke and three quarters of itself at bottom center to counteract its force at the counterweight. A compromise is effected by adding to the counterweight about one-half the weight to the reciprocating parts which is the average of force at all four points. This compromise leaves a portion unbalanced which acts as a force to bounce the engine up and down and also to shake it sidewise. In other words, while the original unbalanced force was along the cylinder axis, it is now changed to minus ¾ at top center, minus ¼ at bottom center and minus ½ at the two midstroke positions.

In an engine having cylinders in line and cranks diametrically opposite each other, one crank is in position requiring one and one quarter the weight of its reciprocating parts at the opposite side of the crank circle while the other crank requires three quarters the weight of its reciprocating parts in the opposite direction, or in other words, the force is changed from minus 1¼ and ¾ in the single crank arrangement to minus ½ and plus ½ in the two crank arrangement thus reaching zero value four times in a revolution instead of two times per revolution as in the single cylinder. The condition found in the second arrangement may be balanced by a simple device placed in such a way as to counteract the force acting along the cylinder axis in a straight line only. Such a device must have the effect of a reciprocating weight with a harmonic motion and two cycles per revolution of the crank. The usual means of producing this effect is to rotate in opposite directions, two weights placed along a projection of the cylinder axis at twice crank shaft speed, their combined motions producing a fluctuating complementary force so timed as to reach zero value at the four exact points and also effect the correction for the ½ reciprocating weight condition. The condition found in the single crank arrangement before making any allowance for reciprocating weight could also be balanced by a reciprocating weight, obviously, but not one having a harmonic motion of no matter what order.

The condition found in the three cylinder radial engine, for which the present invention as shown is particularly designated, is about the same as three single cylinder engines acting on one crank but with connecting rod angularity acting from directions 120 degrees apart, the unbalanced forces bearing no relation to reciprocating weights placed at all cylinder axes and having harmonic motion or to a single weight placed in line with any one cylinder axis having any kind of regular motion.

By careful study of the magnitude of the unbalanced forces and the sequence of their fluctuations, I have devised the herein described means of correcting said forces both in direction and magnitude, said means having nothing in common with other known methods as far as I know. The chief difference being that, since all known devices rotate or swing two like weights in opposite directions producing a straight line force, the present invention produces and utilizes centrifugal force in all directions so timed as to reach zero value six times per revolution. With the preferred embodiment as herein shown, a single rotating weight acts directly upon the counterweight and may be said to be a counterweight within a counterweight or a counter-counterweight.

The invention as herein illustrated and described is of such form and arrangement as to make it particularly adapted for application to a three cylinder radial engine, but it is perfectly obvious that the invention can be effectively applied to other types of engines with only such modifications as can reasonably be assumed as being within the scope of the invention.

An object of the invention is to provide a simple and effective means readily applied to an engine without materially increasing the weight thereof, that will practically eliminate vibrations that are due to the action of unbalanced forces of the engine crank assembly.

Various other objects and advantages of the invention will be in part obvious from an inspection of the accompanying drawings and a careful consideration of the following particular description and claims of one form of mechanism embodying my invention.

Figure 1:
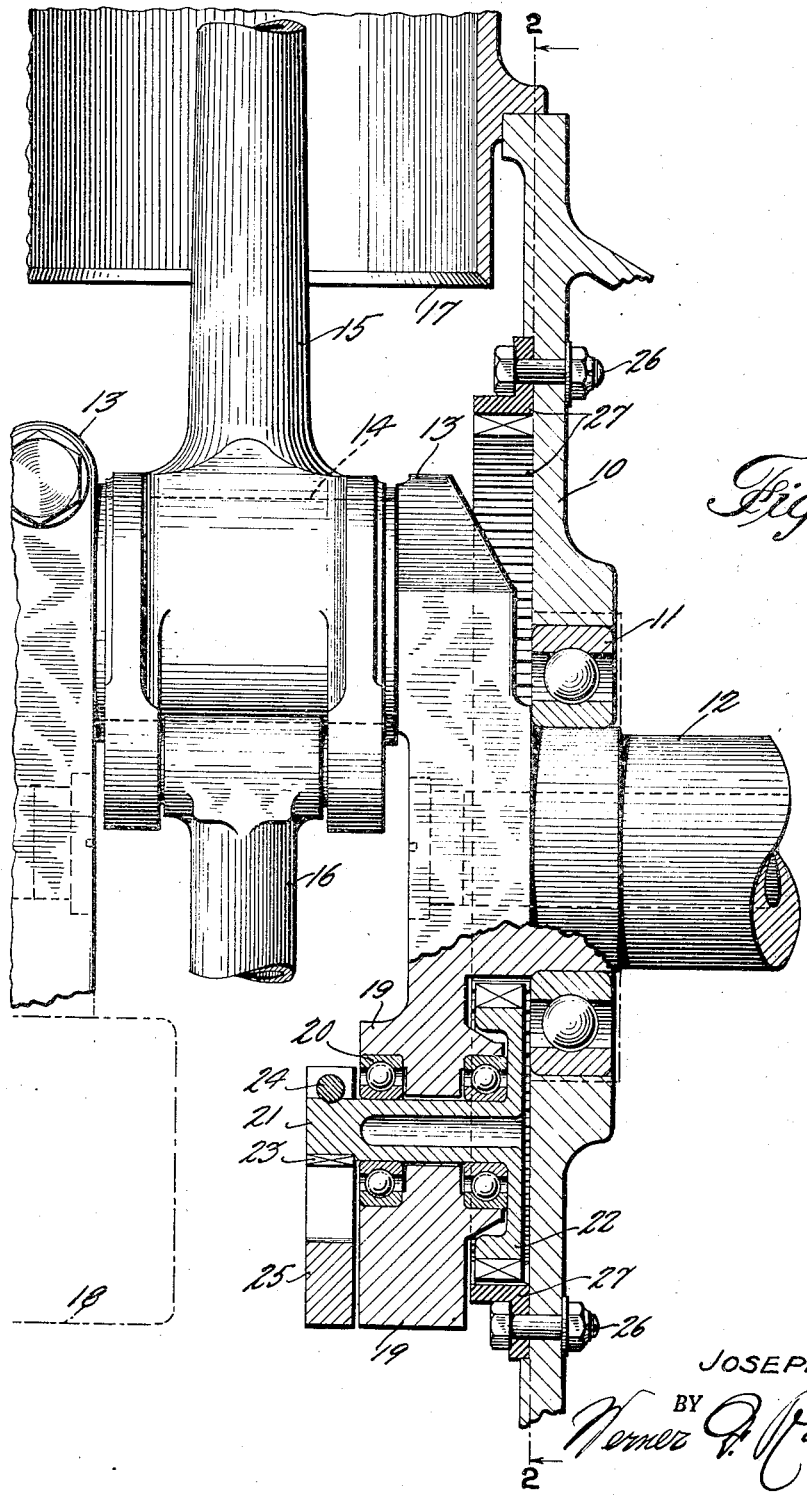
Figure 1 is a fragmentary longitudinal section of an internal combustion engine showing the present invention as applied thereto.
Figure 2:
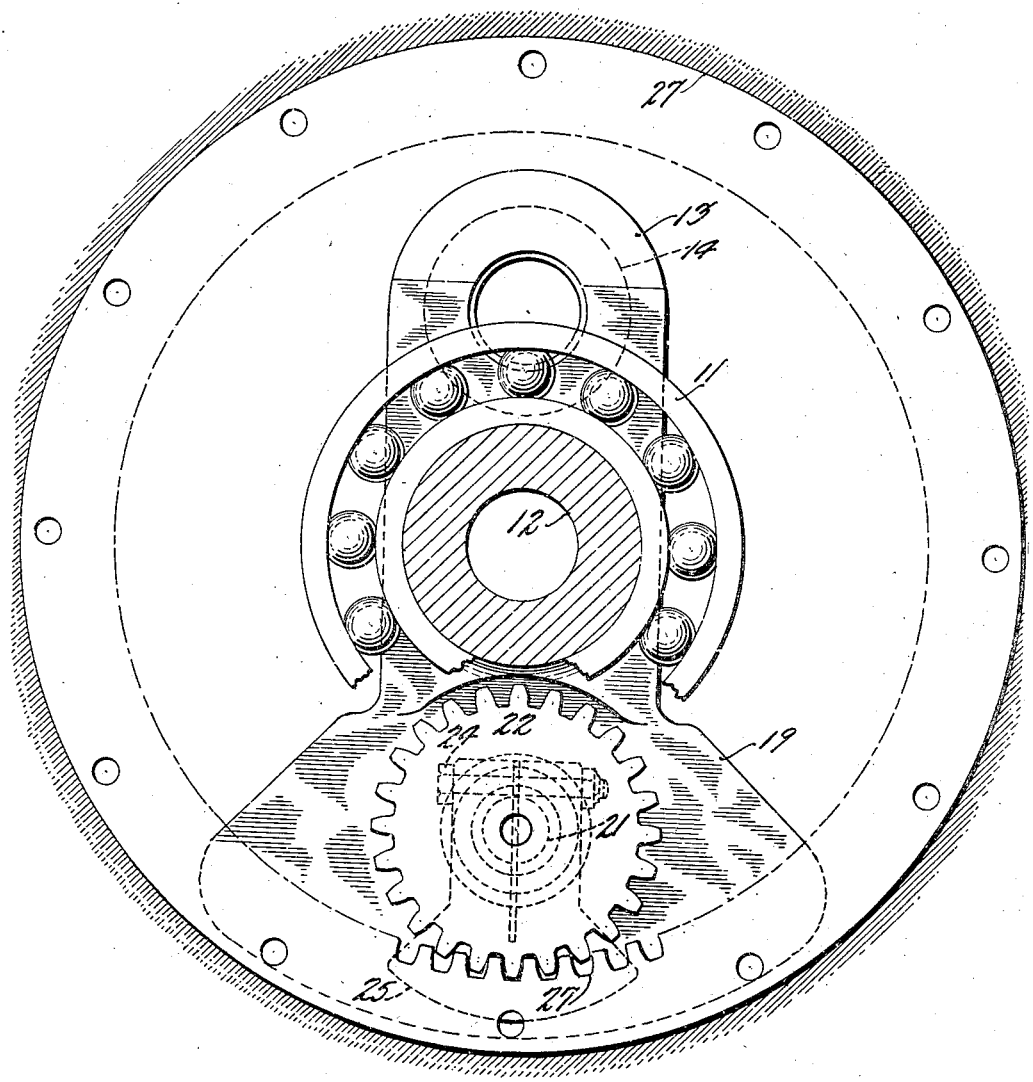
Figure 2 is a cross section taken on the line 2—2 of Fig. 1 as looking in the direction indicated by the arrows.

With reference to the drawings which illustrate the invention as applied to a three cylinder radial engine, 10 designates a portion of the crankcase of the engine in which is rotatably mounted by means of the bearing 11 a drive shaft 12 having the usual crank 13 and a crank pin 14. A master rod 15 carrying a plurality of auxiliary rods 16 is mounted on the crank pin 14 said rods being connected in the usual manner to pistons (not shown) which operate in the cylinders 17.

Engines of the type herein exemplified are usually provided with counterweights 18 and 19 which are either secured to or form an integral part of the crank 13 and disposed diametrically opposite the crank pin 14. In the present instance, the counterweight 19 is formed integral with the crank and it is in this weight or mass 19 that I have conveniently mounted for rotation in the bearing 20 a short shaft 21 on the inner end of which there is either formed a mounted, a planet pinion 22 adapted for planetary rotation in a plane perpendicular to the main shaft axis and disposed conveniently adjacent a wall portion of the crankcase 10 in which the shaft 12 is mounted. On the opposed end of this short shaft 21 I have secured by any suitable means such as the key 23 and the bolt 24, an unbalanced weight 25 adapted for rotation about the axis of the shaft 21.

Upon the inner side of the crankcase 10 and in the plane of the pinion 22 there is secured by means such as bolts 26, a ring gear 27 which is in mesh with the pinion just described and it will readily be understood that as the drive shaft 12 is rotated, the pinion 22 will be rotated about its axis and in a planetary manner around the drive shaft axis during which the position of the weight 25 and its effect will be constantly changed. It will be appreciated that the action of the weight 25 which is rotatably mounted on the counterweight 19 is not only to change its force but also the direction of that force so that it may directly oppose at all times the inertia force at the crank pin by engendering a similar force in the counterweight which of course eliminates or cancels any strain or stresses ordinarily set up in any other part of the engine. In other words, an unbalanced condition is prevented at the very source.

With reference to the above description as far as it applies to the statement that the shaft 21 is mounted for rotation in the counterweight 19, it might be mentioned in passing that it is not considered absolutely essential that said shaft be mounted for rotation directly in said counterweight inasmuch as the pinion, shaft and weight 25 may be supported in a relatively light extension to the crank taking the place of the counterweight.

With such construction, the weight 18 on the opposed side of the crank would accordingly have to be enlarged to such proportions as to compensate for any lack of weight on the side of the pinion. It is however considered advisable to dispose the weight 25 as nearly as possible to the plane of the connecting rods in order to bring the effectiveness of the device near the longitudinal center of the crank pin.

Having thus described my invention, I claim:

1. The combination with a machine having a rotatable member tending to generate unbalanced inertia forces of varying value, of a means tending to modify said unbalanced forces to a constant value, said means including a single element of unbalanced proportions mounted on one side of said rotatable member for rotation relative thereto, and means engaging said element to cause it to planetize about the axis of said rotatable member.

2. In apparatus of the class described, the combination with an engine crank-shaft, of a single element of unbalanced proportions mounted for relative rotation on said crank-shaft diametrically opposite the crank portion thereof, and driving means adapted to impart a planetary movement of said element about the axis of the crank-shaft when said shaft is being rotated.

3. In apparatus of the class described, the combination with a drive shaft having a crank carrying connecting rods tending to generate unbalanced inertia forces of varying value during operation, of a means tending to modify said unbalanced forces to a constant value, said means comprising a single counter-weight rotatably mounted on the drive shaft only on the side diametrically opposite said crank, and driving means engaging with said counter-weight to cause a planetary rotation thereof about the axis of the drive shaft when said shaft is being operated.

4. In an internal combustion engine having three cylinders disposed radially about a drive shaft having a crank and a crank-pin in combination, a balancing device adapted to modify unbalanced forces inherent in the drive-shaft assembly, said device comprising an out-of-balance single weight rotatably mounted for operation only on the side of the shaft opposed to the crankpin, and means drivably engaging said weight to cause it to planetize in an orbit around the axis of said drive-shaft when the same is being operated.

5. The combination with an internal combustion engine having cylinders disposed radially about a crank-shaft, of a balancing device adapted to modify unbalanced forces inherent in the crank-shaft assembly, said device comprising a single out-of-balance weight, a diametrically projected extension to the crank portion of said shaft on which said weight is mounted for rotation, and means adapted to rotate said weight about its axis and simultaneously about the axis of the crank-shaft.

6. The combination with an internal combustion engine having cylinders disposed radially about a crank-shaft, of a balancing device adapted to modify inertia forces tending to produce vibrations in said engine, said device comprising a single out-of-balance weight rotatably mounted on an axis parallel to and in connection with an extended crank portion of said shaft, a gear mounted concentric with said shaft, a further gear drivably connected to the first said gear and to said weight and adapted to rotate the weight about its axis and around the axis of said shaft.

7. The combination with an internal combustion engine having cylinders disposed radially about a drive shaft having a crank and a diametrically projected extension to said crank, of a balancing device comprising a stub shaft mounted for rotation in said extension, a weight secured to said stub shaft and adapted to travel in a circular course about the axis of the stub shaft, a pinion secured to the end of the stub shaft remote from said weight, and a gear disposed concentric with the drive shaft and engaging said pinion to cause the same to planetize about the drive shaft axis when the same is being operated.

8. In apparatus of the class described, in combination, a crank-shaft having a plurality of connecting rods, a stub shaft rotatably mounted in a portion of said crank-shaft, a single weight mounted off center on said stub shaft, a rotatable driving means secured to the stub shaft, and a relatively fixed driving means engaging the first said driving means and adapted to impart thereto and to said weight a planetary motion around the axis of the crank-shaft when said shaft is being operated.

9. In apparatus of the class described, in combination, a drive shaft having a crank and a crank-pin, a plurality of cylinders arranged radially 120 degrees apart and having connecting rods mounted on said crank-pin, an extension to the crank disposed diametrically opposite the crank-pin, a stub shaft mounted for rotation on said extension, an unbalanced weight attached to the stub shaft and disposed adjacent the connecting rods, a rotatable driving means secured to the stub shaft remote from said weight, and a relatively fixed complementary driving means engaging the first said driving means and adapted to impart thereto and to said weight a planetary motion around said drive shaft when said shaft is being operated.

10. The combination with a radial engine having a centrally located crank-shaft and a plurality of connecting rods mounted upon the crank portion of said crank-shaft, of an extended portion on said crank-shaft projecting in a direction diametrically opposite to that of the crank portion thereof, a stub shaft rotatably mounted in said extended portion, a single counterbalancing element eccentrically mounted on the stub shaft on the end adjacent the connecting rods, a pinion on the stub shaft, and a gear mounted in concentric relation with said crank-shaft and adapted to drive said pinion and its associated element in a planetary fashion about said crank-shaft.

11. The combination with a radial engine having a centrally located crank-shaft, of a mass member extending transversely of crank-shaft to counterbalance the crank portion and its associated parts in the operation of said crank-shaft, a single relatively small mass member mounted in the first said mass member on an axis parallel to said crank-shaft, a pinion to drive the small mass member, and a fixed gear to drive said pinion.

12. In an engine having a shaft provided with a crank-pin wherein the inertia forces can be graphically represented by means of a polar diagram approximating a triangle, of a means adapted to modify such inertia forces to a constant value, said means comprising a single rotatable element mounted on the side of the engine shaft opposed to the crank-pin, a pinion on said element, a fixed gear in mesh with said pinion and a weighted portion tending to unbalance said rotatable element.

JOSEPH J. BOLAND.